Aug. 13, 1940.  W. H. MOSS  2,211,071
LAMINATED OR REINFORCED MATERIAL
Filed Feb. 23, 1938
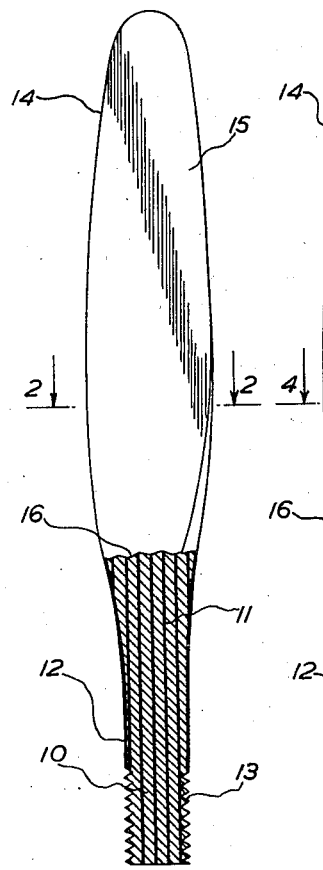
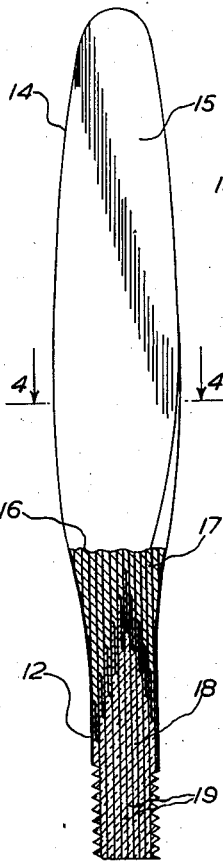
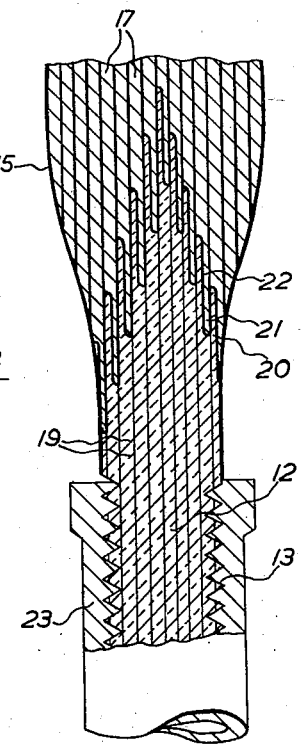
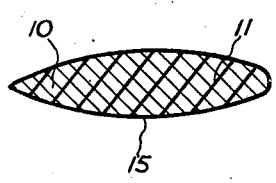
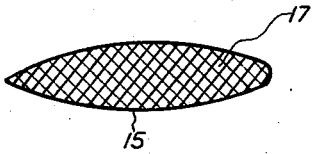
WILLIAM H. MOSS
INVENTOR
ATTORNEYS Patented Aug. 13, 1940

2,211,071

UNITED STATES PATENT OFFICE 2,211,071

LAMINATED OR REINFORCED MATERIAL

William Henry Moss, London, England, assignor to Celanese Corporation of America, a corporation of Delaware Application February 23, 1938, Serial No. 191,926
In Great Britain February 26, 1937

12 Claims. (Cl. 170—159)

This invention relates to laminated or reinforced materials and to articles made therefrom.

The problem sometimes arises of constructing from non-metallic material a relatively light rigid member having a portion of reduced cross-sectional area integral with the remainder, and compensating for the loss in strength which would otherwise result from the reduction in cross-section by making the reduced portion of stronger material than the remainder. Thus for example a well known type of air-screw comprises a metallic boss having radial sockets into which are screwed blades of wood or other light non-metallic material. The root of each blade is of reduced cross-section so as to enable it to fit into the metallic socket and is integral with the remainder of the blade so as to avoid the use of bolts, collars or the like. In view, however, of the great stress to which the root of the blade is subject, it is very desirable that it should be of stronger material than the main body of the blade, which must be made of light material in order to obtain the desired area without undue weight.

In one form of air-screw of the kind referred to, the whole of the blade is built up of laminae of wood alternating with layers of a synthetic resin or other adhesive. The root is formed from a larger number of laminae than the remainder and has initially a greater cross-sectional area than is ultimately required. It is reduced to the desired area by heavy pressure.

The present invention provides a new method of producing specially strong reduced portions of light structural members made of non-metallic material and is of particular importance in the production of air-screw blades made for the most part of wood or other light non-metallic material and having a reduced root integral with and of stronger material than the remainder of the blade. The invention also provides a method of general application for joining members of non-metallic materials such as wood to metallic members without the use of bolts or pins in such a way that the assembly will withstand great stresses.

According to the invention that portion of the member which is to be of reduced section or which is to be secured to the metallic member is formed of a thermoplastic derivative of cellulose suitably reinforced and united to the main body of the non-metallic member so as to be integral therewith. Thus in one application of the invention to the production of blades for variable-pitch air-screws, the body of the blade is built up of laminae of wood united by means of a suitable adhesive, e. g. glue or casein or a heat hardening synthetic resin and the root is a block of cellulose acetate reinforced with layers of textile fabric. Both portions are formed with a number of projecting tongues, the tongues of the one portion being adapted to fit between and be united to those of the other portion. A screw-thread is formed on the root to screw into a socket carried by the boss on the air-screw shaft.

A very suitable material for the reinforcement of the root is a fabric of non-thermoplastic material. Cotton or linen may be used for this purpose but it is of particular advantage to use fabrics the yarns of which are formed from continuous filaments of regenerated cellulosic material. Material obtained by saponifying high tenacity yarns of cellulose acetate or other organic ester of cellulose are particularly useful. The high tenacity cellulose ester yarns may be made from filaments which have been stretched very considerably either in the course of a wet spinning process or after spinning, the plasticity necessary to allow the desired stretching being obtained in the second case by means of organic swelling agents for the cellulose ester or steam or hot water. The composite material of the root may, for example, be built up by consolidating under heat and pressure an assembly of layers of the reinforcing fabric alternating with layers of the cellulose derivative in the form of sheets or foils, fabric or powder; or the cellulose derivative may be applied in the form of a dope to sheets of the reinforcing material.

Consolidation of the assembly under heat and pressure is preferably assisted by the presence of a liquid having a solvent or softening action on the cellulose derivative. The liquid may be a true solvent therefor. Thus for example, where the cellulose derivative is cellulose acetate, acetone, diacetone alcohol, methylene ethylene ether or dioxane, or a solvent mixture such as ethylene chloride or methylene chloride with ethyl or methyl alcohol may be used. Or a liquid which is not a solvent at ordinary temperatures but develops solvent properties for the cellulose derivative when heated may be used, for example an alcohol such as methyl, ethyl or propyl alcohol diluted with water or with a non-aqueous diluent such as benzene, toluene or other liquid hydrocarbon miscible with the alcohol. When the cellulose derivative is cellulose acetate a very suitable liquid is a 70 to 90% aqueous solution of methyl or ethyl alcohol.

Consolidation of the assembly from which the root of the blade is formed may be effected in the absence of a volatile liquid. In this case it is preferable that a substantial quantity of a plasticiser for the cellulose derivative should be present. For example, in the case of cellulose acetate, triacetin, dimethyl or diethyl phthalate, tricresyl phosphate or triphenyl phosphate may be present. It is of advantage when the use of a volatile liquid is dispensed with to wet the assembly with water before applying the heat and pressure necessary to effect consolidation. Plasticisers for the cellulose derivative may be compounded therewith before making up the assembly or may be applied to the assembly together with any assisting liquid used. For instance, when aqueous alcohol is used as the assisting liquid this may contain in solution a plasticiser, such for example as those referred to above.

For effecting union between the material of the root and that of the main body of the blade, a fabric containing yarns of textile material which can readily be caused to adhere to the material of the main body of the blade, in admixture with yarns which can readily be caused to adhere to the cellulose derivative is very suitable. Thus, for example, where the body of the blade is of wood and the root is of cellulose acetate, union may be effected by means of a fabric formed from cellulosic yarns, for example cotton, linen or regenerated cellulose in admixture with yarns of a cellulose derivative, preferably cellulose acetate. Although plain woven fabrics may be used for this purpose, it is preferable to use a fabric in which one face consists largely or substantially of the one component, for example cotton, and the other face of the other component, for example cellulose acetate. Thus, fabrics having a velvet or velveteen structure or even pile fabrics may be used with advantage. For joining cellulose acetate and wood a very suitable fabric is a satin having a cotton backing and a face in which the weft is of cellulose acetate and the warp is of cotton. Such fabrics can be joined to the cellulose derivative material of the root in the cold by moistening the cellulose derivative face of the fabric with a suitable solvent for the cellulose derivative and pressing that face of the fabric against the cellulose acetate material, or heat and pressure can be used to effect or assist union.

Any of the assisting liquids referred to in connection with the formation of the root of the blade can be used to assist union between the cellulose derivative and the mixed fabric; or a solution of a cellulose derivative in a volatile solvent can be used. After one face of the composite fabric has been united by suitable means to the cellulose derivative material of the root, the other face can be united to the wood of the main body of the blade by means of glue, casein or other suitable adhesive. Alternatively, the composite fabric may be stuck to the wood of the main portion of the blade first and may subsequently be caused to adhere to the cellulose derivative of the root.

According to a modification of the invention the whole of the air-screw blade is built up of alternate layers of a cellulose derivative and of cellulosic material. The cellulosic material may be wood used in the form of thin laminae and joined to adjacent layers of cellulose acetate by the use of a composite fabric as described above.

The stem portion may be formed under greater pressure than the main body of the blade and/or may be reinforced with a cellulosic fabric instead of with laminae of wood.

The invention is illustrated in the accompanying drawing wherein

Fig. 1 shows in part-sectional elevation an air-screw blade composed of alternating laminae of wood and cellulose acetate, Fig. 2 is a sectional plan through the plane 2—2 of Fig. 1, Fig. 3 shows in part-sectional elevation an air-screw blade in which the body portion is composed of laminae of wood glued together and the root portion is of reinforced cellulose acetate, the two portions being joined by means of a mixed cellulose acetate cotton fabric, Fig. 4 is a sectional plan through the plane 4—4 of Fig. 3, and Fig. 5 is a detail view on a larger scale of the root and lower part of the body portion of the air-screw shown in Fig. 3 showing also the attachment of the blade to a metal socket on the boss of a variable pitch air-screw.

Referring to Figs. 1 and 2 the air-screw blade shown is shaped from a block built up of laminae 10 of wood alternating with laminae of cellulose acetate 11, the two components having been caused to adhere by heat and pressure in the presence of a volatile solvent such as acetone or a liquid, for example 80% aqueous methanol or ethanol, which develops solvent properties for cellulose acetate at elevated temperatures. For simplicity the laminae have been shown thicker and fewer in number than in the blade as actually constructed. The root 12 of the blade is threaded at 13 so as to screw into the metal socket of the variable pitch air-screw boss. The whole of the body portion 14 of the blade and the upper portion of the root of the blade are covered with a protective covering 15 comprising a cotton fabric heavily impregnated with cellulose acetate and caused to adhere to the blade through heat and pressure in the presence of a solvent or softening agent for the cellulose acetate such as is used in uniting the cellulose acetate to the wood. This covering is shown broken away at 16 to reveal the construction of the root of the blade. It is polished to reduce frictional resistance.

Referring now to Figs. 3, 4 and 5, the air-screw blade shown comprises a body portion 14 composed of laminae 17 of wood glued together and a root portion 12 composed of cellulose acetate 18 reinforced by layers of high tenacity regenerated cellulosic fabric 19. The root portion 12 and body portion 14 terminate in tongues 20 and 21 respectively which are united by means of a mixed fabric 22 of cellulose acetate and cotton glued to the wooden tongues 21 of the body portion of the blade and caused to adhere to the cellulose acetate tongues 20 of the root portion of the blade by means of heat and pressure in the presence of a solvent or softening liquid for the cellulose acetate such as has been described above. On the root portion 12 of the blade, a screw thread 13 is formed and in Fig. 5, the blade is shown screwed into the metal socket 23 of a variable pitch air-screw boss. The body portion and upper root portion of the blade has a protective covering 15 similar to that described in connection with Figs. 1 and 2.

The invention has been described with particular reference to the production of air-screw blades for attachment to a metal boss. In a similar way the blades for axial-flow fans can be made. The invention includes the production of an air-screw or fan rotor in which the boss is integral with the blades and is made and united to the blades by methods such as are described above in relation to the stem portion of detachable blades. The invention is in fact quite broadly applicable wherever it is desired to construct light rigid members having portions of reduced cross-sectional area integral with the remainder, said portions being formed of stronger material than the remainder to compensate for the loss in strength which would otherwise be caused by the reduction in section.

Moreover, as indicated above, the invention provides a means of general application for securing a member such for example as a blade composed largely of wood, to a metallic member without weakening either member by the use of bolts or pins. This may be done by providing the non-metallic member with a portion of reinforced cellulose derivative material integral with the wood or the like by the methods described above. A thread by means of which the member can be screwed into a metallic socket can then be cut or impressed on the cellulose derivative portion and by virtue of the properties of the cellulose derivative this thread can be made stronger and better fitting than if it were cut in wood. The invention includes such methods and the products thereof whether or not the cellulose derivative portion of the member is of reduced cross-section. Thus e. g. in aircraft construction cantilever members may be made for the most part of wood and provided with stronger root portions of reinforced cellulose derivative material. Wooden struts may be reinforced with such material where the maximum stress is experienced, and to obtain strength with minimum air resistance small struts may be made largely of reinforced cellulose derivative and provided with enlarged end portions of wood which can be secured to the other members of the frame by gluing instead of by the use of metal fastenings.

The invention is not limited to the use of any particular cellulose derivative. Valuable results are obtainable using cellulose acetate as the cellulose derivative but other thermoplastic derivatives of cellulose which can be employed include nitrocellulose, cellulose propionate, cellulose butyrate, cellulose acetate-nitrate, ethyl cellulose, benzyl cellulose, ethyl cellulose acetate and oxyethyl cellulose acetate. The cellulose derivative used should preferably be of high tenacity and should have been made by methods involving little or no degradation of the cellulose.

Having described my invention, what I desire to secure by Letters Patent is:

1. An air-screw blade composed along one part of its length of laminae of compact fibrous cellulosic material, said laminae being adhesively united, and along another part of its length of a derivative of cellulose, while along an intermediate part of said length projecting tongues of the cellulosic material alternate with and are adherent to projecting tongues of the derivative of cellulose, the construction and arrangement being such that the laminae of cellulosic material form a hollow into which the derivative of cellulose extends and is united to the cellulosic material.

2. A rigid elongated constructional member composed along one part of its length of laminae of compact fibrous cellulose material, said laminae being adhesively united, and along another part of its length of a derivative of cellulose, while along an intermediate part of said length projecting tongues of the cellulosic material alternate with and are adherent to projecting tongues of the derivatives of cellulose, the adhesion between the cellulosic material and the derivative of cellulose being affected with the aid of a mixed fabric of which one component adheres to the cellulosic material and the other to the derivative of cellulose.

3. An air-screw blade composed along one part of its length of laminae of wood, said laminae being adhesively united, and along another part of its length of organic derivative of cellulose while along an intermediate part of said length, projecting tongues of the wood alternate with and are adherent to projecting tongues of the organic derivative of cellulose, the construction and arrangement being such that the laminae of wood form a hollow into which the organic derivative of cellulose extends and is united to the wood.

4. An air-screw blade composed along one part of its length of laminae of wood, said laminae being adhesively united, and along another part of its length of cellulose acetate while along an intermediate part of said length, projecting tongues of the wood alternate with and are adherent to projecting tongues of the cellulose acetate, the construction and arrangement being such that the laminae of wood form a hollow into which the cellulose acetate extends and is united to the wood.

5. An air-screw blade having its body portion composed of laminae of wood adhesively united and its stem portion of an organic derivative of cellulose, the two portions being united by adhesion between tongues of wood projecting from the body portion of the blade and tongues of the derivative of cellulose projecting from the stem portion, the construction and arrangement being such that the laminae of wood form a hollow into which the stem portion of an organic derivative of cellulose extends and is united to the wood.

6. A rigid elongated constructional member composed along one part of its length of laminae of wood, said laminae being adhesively united, and along another part of its length of organic derivative of cellulose, while along an intermediate part of said length, projecting tongues of the wood alternate with and are adherent to projecting tongues of the organic derivative of cellulose, the adhesion between the wood and the organic derivative of cellulose being effected with the aid of a mixed fabric of which one component adheres to the wood and the other to the organic derivative of cellulose.

7. A rigid elongated construction member composed along one part of its length of laminae of wood, said laminae being adhesively united, and along another part of its length of cellulose acetate, while along an intermediate part of said length, projecting tongues of the wood alternate with and are adherent to projecting tongues of the cellulose acetate, the adhesion between the wood and the cellulose acetate being effected with the aid of a mixed fabric of which one component adheres to the wood and the other to the cellulose acetate.

8. An air-screw blade composed along one part of its length of laminae of compact fibrous cellulosic material, said laminae being adhesively united, and along another part of its length of a derivative of cellulose reinforced with cellulosic textile material, while along an intermediate part of said length, projecting tongues of the cellulosic material alternate with and are adherent to projecting tongues of the derivative of cellulose, the construction and arrangement being such that the laminae of cellulosic material form a hollow into which the derivative of cellulose extends and is united to the cellulosic material.

9. A rigid elongated constructional member composed along one part of its length of laminae of wood, said laminae being adhesively united and along another part of its length of an organic derivative of cellulose reinforced with a fabric of cellulosic material, while along an intermediate part of said length, projecting tongues of the wood alternate with and are adherent to projecting tongues of the derivative of cellulose, the adhesion between the wood and the derivative of cellulose being effected with the aid of a mixed fabric of which one component adheres to the wood and the other to the derivative of cellulose.

10. An air-screw blade having its body portion composed of laminae of wood adhesively united and its stem portion of an organic derivative of cellulose reinforced with a fabric containing yarns of regenerated cellulose of high tenacity, the two portions being united by adhesion between tongues of wood projecting from the body portion of the blade and tongues of the derivative of cellulose projecting from the stem portion, the construction and arrangement being such that the laminae of wood form a hollow into which the stem portion of an organic derivative of cellucellulose threads to the wood.

11. An air-screw blade having its body portion composed of laminae of wood adhesively united and its stem portion of an organic derivative of cellulose reinforced with a fabric containing yarns of regenerated cellulose of high tenacity, the two portions being united by adhesion between tongues of wood projecting from the body portion of the blade and tongues of the derivative of cellulose projecting from the stem portion, the union between the stem and body portions of the blade being effected with the aid of a mixed fabric of an organic derivative of cellulose and regenerated cellulose, the cellulose derivative threads of the fabric adhering to the cellulose derivative of the stem portion of the blade and the regenerated cellulose threads to the wood.

12. An air-screw blade having its body portion composed of laminae of wood adhesively united and its stem portion of cellulose acetate reinforced with a fabric containing yarns of regenerated cellulose of high tenacity, the two portions being united by adhesion between tongues of wood projecting from the body portion of the blade and tongues of the cellulose acetate projecting from the stem portion, the union between the stem and body portions of the blade being effected with the aid of a mixed fabric of cellulose acetate and regenerated cellulose, the cellulose acetate threads of the fabric adhering to the cellulose acetate of the stem portion of the blade and the regenerated cellulose threads to the wood.

WILLIAM HENRY MOSS.

CERTIFICATE OF CORRECTION.

Patent No. 2,211,071. August 13, 1940.

WILLIAM HENRY MOSS.

It is hereby certified that error appears in the printed specification of the above numbered patent requiring correction as follows: Page 3, first column, line 71, claim 2, for the word "cellulose" read --cellulosic--; page 4, first column, lines 28 and 29, claim 10, for "cellu- cellulose threads" read --cellulose extends and is united--; and that the said Letters Patent should be read with this correction therein that the same may conform to the record of the case in the Patent Office.

Signed and sealed this 17th day of September, A. D. 1940.

(Seal)

Henry Van Arsdale,
Acting Commissioner of Patents.